United States Patent
Inoue (12)

(10) Patent No.: US 10,339,471 B2
(45) Date of Patent: Jul. 2, 2019

(54) ENSEMBLE BASED LABELING

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 15/407,692

(22) Filed: Jan. 17, 2017

(65) Prior Publication Data

US 2018/0204082 A1    Jul. 19, 2018

(51) Int. Cl.
| | |
|---|---|
| G06K 9/46 | (2006.01) |
| G06N 99/00 | (2019.01) |
| G06K 9/00 | (2006.01) |
| G06K 9/62 | (2006.01) |
| G06N 20/00 | (2019.01) |

(52) U.S. Cl.
CPC .......... *G06N 20/00* (2019.01); *G06K 9/6277* (2013.01); *G06K 9/6289* (2013.01)

(58) Field of Classification Search
CPC ............. G06K 9/4604; G06K 9/00577; G06K 99/005; G06K 9/6201
See application file for complete search history.

(56) References Cited

U.S. PATENT DOCUMENTS

| | | | |
|---|---|---|---|
| 7,904,397 B2 | 3/2011 | Fan et al. | |
| 8,635,172 B1* | 1/2014 | Buryak | G06K 9/6262 706/12 |
| 9,435,648 B2* | 9/2016 | Chang | G01C 21/005 |
| 9,563,822 B2* | 2/2017 | Pham | G06K 9/6226 |
| 2010/0166260 A1* | 7/2010 | Huang | G06K 9/00771 382/103 |
| 2010/0169252 A1* | 7/2010 | Fan | G06N 99/005 706/13 |
| 2011/0087627 A1 | 4/2011 | Schmid et al. | |
| 2015/0278601 A1* | 10/2015 | Nagamine | G06T 7/277 382/103 |
| 2016/0379371 A1* | 12/2016 | Chen | G06K 9/4604 382/173 |
| 2018/0032845 A1* | 2/2018 | Polak | G06K 9/6269 |

* cited by examiner

*Primary Examiner* — Vincent Rudolph
*Assistant Examiner* — Pinalben Patel
(74) *Attorney, Agent, or Firm* — Tutunjian & Bitetto, P.C.; Vazken Alexanian (57) ABSTRACT

A method for ensemble based labeling is provided. The method includes obtaining a plurality of samples of an object. The method further includes estimating, for each of the plurality of samples, a probability that a label applies to the sample, for each of a plurality of labels. The method also includes determining a candidate label among the plurality of labels, based on the estimated probabilities of the plurality of samples for each of the plurality of labels. The method further includes calculating a dispersion of the estimated probabilities of the plurality of samples for the candidate label; and identifying a target label among the plurality of labels, based on the estimated probabilities of the plurality of samples for the candidate label, the dispersion for the candidate label, and a number of the plurality of samples.

5 Claims, 5 Drawing Sheets

| NN1 | Label A | Label B | Label C |
|---|---|---|---|
| Sample 1 | 51% | 32% | 17% |

| NN1 | Label A | Non-A | Label B | Label C |
|---|---|---|---|---|
| Sample 1 | 51% | 49% | 32% | 17% |
| Sample 2 | 66% | 34% | 23% | 11% |
| Sample 3 | 71% | 29% | 15% | 14% |
| ⋮ | ⋮ | ⋮ | ⋮ | ⋮ |
| Sample N+1 | 59% | 41% | 22% | 19% |
| Average | 62% | 38% | 23% | 15% |
| CI | ±10% | ±10% | ±8% | ±12% |

ENSEMBLE BASED LABELING

BACKGROUND

Technical Field

The present invention generally relates to identification of a label, and more particularly to identification of a label applying to an object.

Description of the Related Art

An ensembling technique has been used for classification tasks, by which an object is classified into a category and a label is applied to the object according to the classification. The ensemble technique can improve accuracy for the classification task, but demands additional computational cost.

SUMMARY

According to an aspect of the present invention, a method for ensemble based labeling is provided. The method includes obtaining a plurality of samples of an object. The method further includes estimating, for each of the plurality of samples, a probability that a label applies to the sample, for each of a plurality of labels. The method also includes determining a candidate label among the plurality of labels, based on the estimated probabilities of the plurality of samples for each of the plurality of labels. The method further inludes calculating a dispersion of the estimated probabilities of the plurality of samples for the candidate label; and identifying a target label among the plurality of labels, based on the estimated probabilities of the plurality of samples for the candidate label, the dispersion for the candidate label, and a number of the plurality of samples.

According to another aspect of the present invention, an apparatus for ensemble based labeling is provided. The apparatus includes a processor. The apparatus further includes one or more non-transitory computer readable mediums collectively including instructions that, when executed by the processor, cause the processor to perform operations including obtaining, by a processor, a plurality of samples of an object, estimating, by the processor, for each of the plurality of samples, a probability that a label applies to the sample, for each of a plurality of labels, determining, by the processor, a candidate label among the plurality of labels, based on the estimated probabilities of the plurality of samples for each of the plurality of labels, calculating, by the processor, a dispersion of the estimated probabilities of the plurality of samples for the candidate label, and identifying, by the processor, a target label among the plurality of labels, based on the estimated probabilities of the plurality of samples for the candidate label, the dispersion for the candidate label, and a number of the plurality of samples.

According to yet another aspect of the present invention, a non-transitory computer-readable storage medium having instructions embodied therewith, the instructions executable by a processor or programmable circuitry to cause the processor or programmable circuitry to perform operations including obtaining, by a processor, a plurality of samples of an object, estimating, by the processor, for each of the plurality of samples, a probability that a label applies to the sample, for each of a plurality of labels, determining, by the processor, a candidate label among the plurality of labels, based on the estimated probabilities of the plurality of samples for each of the plurality of labels, calculating, by the processor, a dispersion of the estimated probabilities of the plurality of samples for the candidate label, and identifying, by the processor, a target label among the plurality of labels, based on the estimated probabilities of the plurality of samples for the candidate label, the dispersion for the candidate label, and a number of the plurality of samples.

These and other features and advantages will become apparent from the following detailed description of illustrative embodiments thereof, which is to be read in connection with the accompanying drawings.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
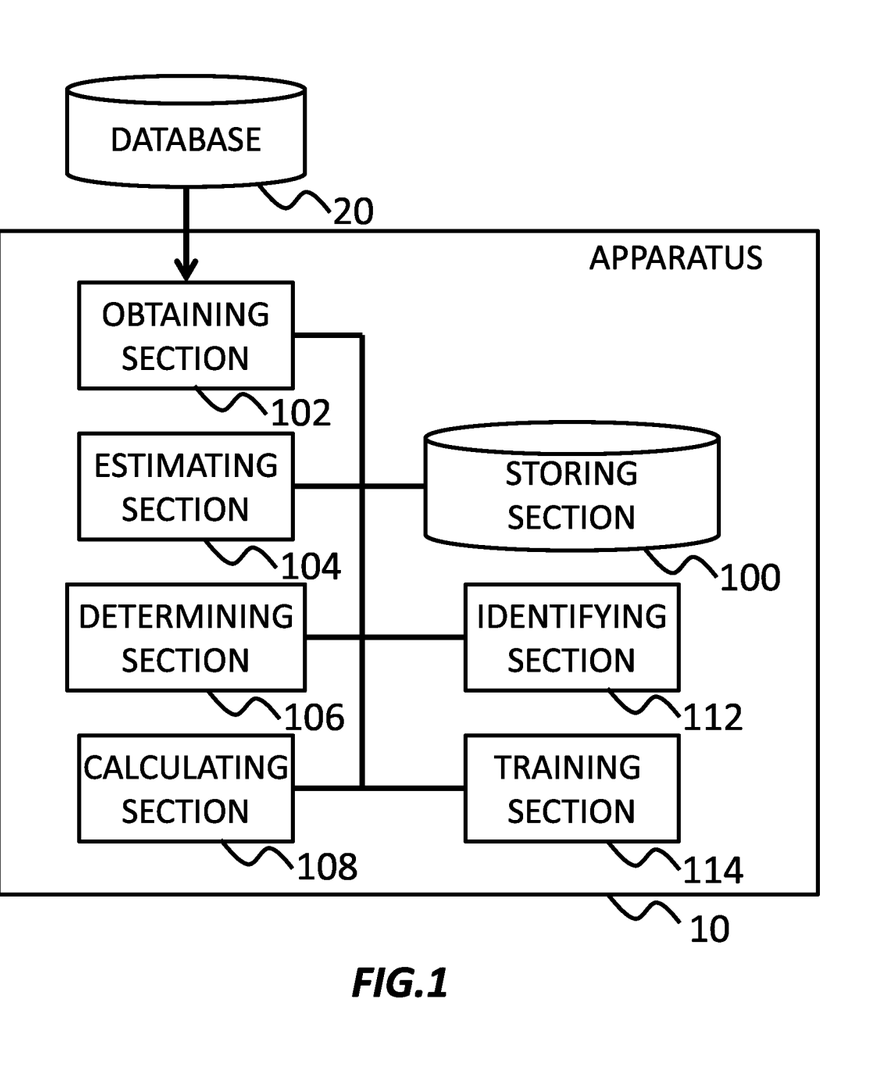
FIG. 1 shows an exemplary configuration of an apparatus 10, according to an embodiment of the present invention.

FIG. 1 shows an exemplary configuration of an apparatus 10 (e.g., a computer, a programmable circuit, etc.), according to an embodiment of the present invention. The apparatus 10 can identify a label that applies to an object by using a model based on at least an ensembling technique. The apparatus 10 can include a processor and/or a programmable circuitry and one or more computer readable mediums collectively including instructions. The instructions, when executed by the processor or programmable circuitry, can cause the processor or the programmable circuitry to operate as a plurality of operating sections. Thereby, the apparatus 10 can be represented as a storing section 100, an obtaining section 102, an estimating section 104, a determining section 106, a calculating section 108, an identifying section 112, and a training section 114.

The storing section 100 can store a variety of data used for operations of the apparatus 10. The storing section 100 can include a volatile or non-volatile memory. One or more other elements in the apparatus 10 (e.g., the obtaining section 102, the estimating section 104, the determining section 106, the calculating section 108, the identifying section 112, and the training section 114, etc.) can communicate data directly or via the storing section 100.

The obtaining section 102 can obtain a plurality of samples of an object. In an embodiment, the plurality of samples can be a plurality of images of the object. The obtaining section 102 can obtain the plurality of samples by initially obtaining an initial sample of the object and then obtaining one or more additional samples of the object. The obtaining section 102 can also obtain training data for training a model. The obtaining section 102 can obtain the plurality of samples and the training data from a database 20 and store the plurality of samples into the storing section 100.

The estimating section 104 can estimate, for each of the plurality of samples, a probability that a label applies to the sample, for each of a plurality of labels. The estimating section 104 can estimate the probability by inputting each sample into the model. The model can be a classification model such as a neural network.

The determining section 106 can determine a candidate label among the plurality of labels, based on the estimated probabilities of the plurality of samples for each of the plurality of labels. In an embodiment, the determining section 106 can determine a label having the largest average of the estimated probabilities of the plurality of samples for each of the plurality of labels, as the candidate label.

The calculating section 108 can calculate a dispersion of the estimated probabilities of the plurality of samples for the candidate label. In one embodiment, the calculating section can further calculate a confidence interval based on the estimated probabilities of the plurality of samples for the candidate label estimated by the estimating section 104, the calculated dispersion for the candidate label, and the number of the plurality of samples.

The identifying section 112 can identify a target label among the plurality of labels, based on the estimated probabilities of the plurality of samples for the candidate label estimated by the estimating section 104, the dispersion for the candidate label calculated by the calculated section 108, and the number of the plurality of samples. The target label is a label to be finally applied to the object. In an embodiment, the identifying section 112 can identify the target label among the plurality of labels based on the confidence interval for the candidate label calculated by the calculating section 108.

The training section 114 can train the model using the training data obtained by the obtaining section 102. The trained model is used by the estimating section 104.

Figure 2:
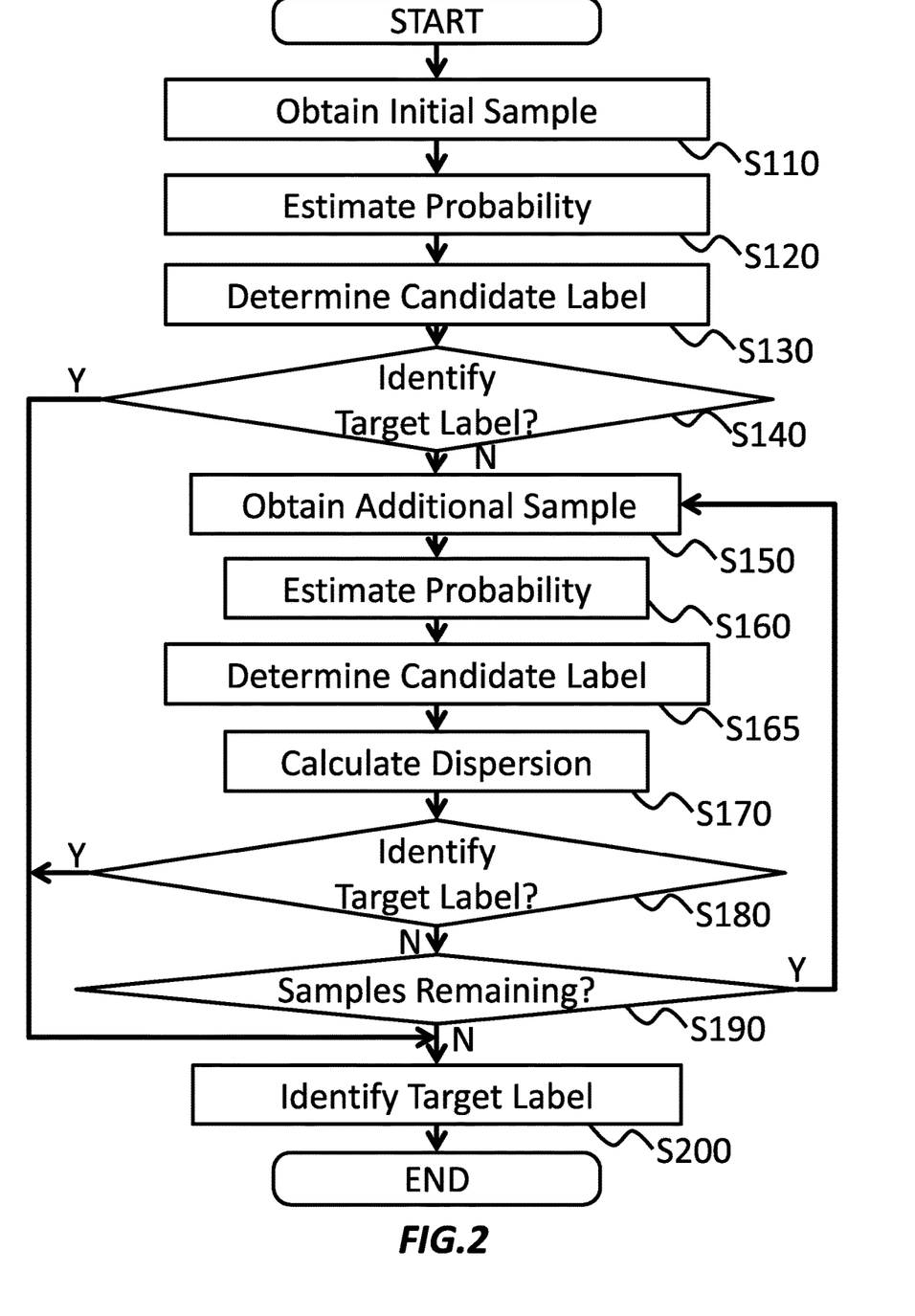
FIG. 2 shows an operational flow according to an embodiment of the present invention.

FIG. 2 shows an operational flow according to an embodiment of the present invention. The present embodiment describes an example in which an apparatus, such as the apparatus 10, performs the operations from S110 to S200, as shown in FIG. 2. The apparatus can identify a target label of an object by performing the operations of S110-S200.

At S110, an obtaining section, such as the obtaining section 102, can obtain an initial sample of an object from a database such as the database 20 or the storing section 100. The initial sample can be a single sample from among all samples of the object. All the samples of the object can be previously prepared and stored in the database or can be generated by the apparatus before an operation of S110.

In some embodiments, each of the samples of the object can be an image of the object. In illustrative embodiments, the samples can be edited images generated from an original image, original images of the object, or any combination thereof. In applicable embodiments, the original images can be edited in different manners (e.g., cutting, rotating, scaling, shifting, twisting, adding noise, and so on).

In illustrative embodiments, the object can be a target to be classified by a plurality of labels. In these embodiments, the plurality of labels can correspond to a plurality of classes (e.g., categorized animals, plants, tools, items, devices, concepts and the like).

In other embodiments, the object can be a fact to be estimated as true or false. In these embodiments, the plurality of labels can correspond to "true" or "false." In further embodiments, the object can be speech data to which word(s) or phoneme(s) apply. In an embodiment, the plurality of labels can correspond to words and/or phonemes.

At S120, an estimating section, such as the estimating section 104, can estimate a probability that a label applies to the initial sample for each of a plurality of labels. In an embodiment, the estimating section can utilize a model, such as a neural network, for performing the estimation of the probability.

For example, the estimating section can estimate the probability by inputting data of the initial sample (e.g., image data) into the neural network and obtain data output from the neural network as the probability. The estimating section can obtain the probabilities of the initial sample for the plurality of labels at once such that a sum of the probabilities is 1.

Figure 3:
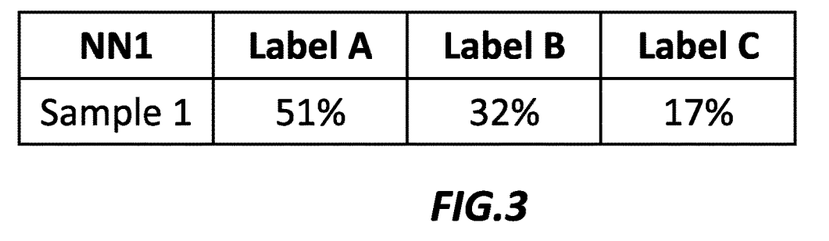
FIG. 3 shows the estimated probabilities according to an embodiment of the present invention.

FIG. 3 shows the estimated probabilities according to an embodiment of the present invention. In an embodiment of FIG. 3, the estimating section can estimate a probability that a label A applies to the initial sample "Sample 1" to be 51%, a probability that a label B applies to "Sample 1" to be 32%, and a probability that a label C applies to "Sample 1" to be 17%.

At S130, a determining section, such as the determining section 106, can determine a candidate label among the plurality of labels, based on the estimated probabilities of the initial sample for each of the plurality of labels. In an embodiment, the determining section can determine a label for which the estimating section has calculated the largest probability at S120, as the candidate label among the plurality of labels. In an embodiment of FIG. 3, the determining section can determine Label A, which has the largest possibility, as the candidate label.

At S140, an identifying section, such as the identifying section 112, can judge whether to identify a target label. In an embodiment, the identifying section can judge whether the estimated probability of the initial sample for the candidate label is above a threshold.

Figure 4:
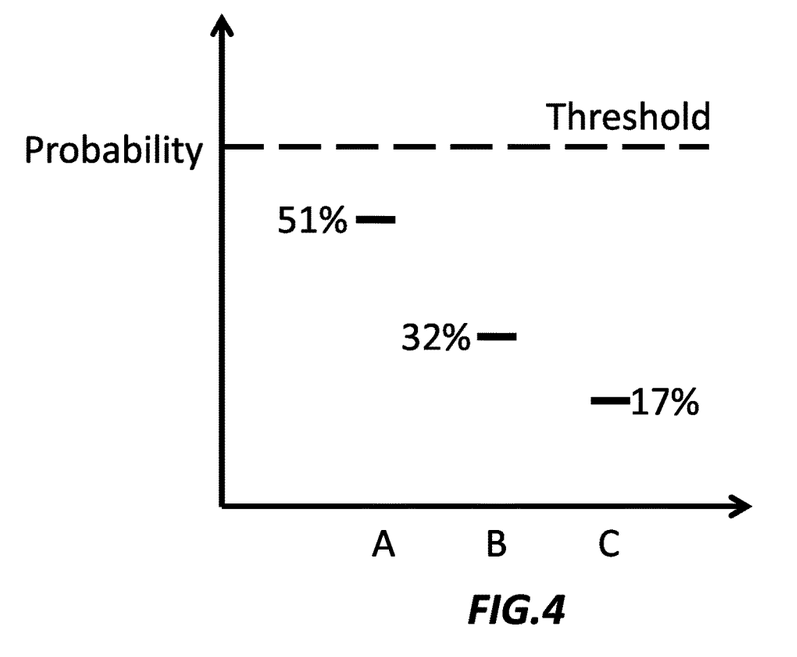
FIG. 4 shows the estimated probabilities for labels A, B, C and a threshold according to an embodiment of the present invention.

FIG. 4 shows the estimated probabilities for labels A, B, C and a threshold according to an embodiment of the present invention. In an embodiment of FIG. 4, the estimated probabilities for label A, B, C are the same as those shown in FIG. 3. In an embodiment, the identifying section can judge that the estimated probability 51% of the label A is not above a threshold (e.g., 80%), and thus the judgment at S140 is negative.

If the judgement is positive, the identifying section can proceed with an operation of S200. If the judgement is negative, the identifying section can proceed with an operation of S150.

At S150, the obtaining section can obtain one or more additional samples. The one or more additional samples can be a plurality of additional samples in an embodiment, and can be one sample according to another embodiment. Hereinafter, the one or more additional samples obtained at the current iteration of S150 can be referred to as the additional sample(s).

All obtained samples (i.e., the initial sample obtained at an operation of S110 and the additional sample(s) obtained at current and previous iterations of S150) can be referred to as the "plurality of samples." The obtaining section can obtain sample(s) that have not been obtained at S110 and previous iterations of S150, as the additional sample(s) at the current iteration of S150, among all the samples. The obtaining section can obtain the additional sample(s) from a database such as the database 20 or the storing section 100.

At S160, the estimating section can estimate a probability that a label applies to each of the additional sample(s) for each of a plurality of labels. The estimating section can perform the operation of S160 in the same manner as the operation of S120.

Figure 5:
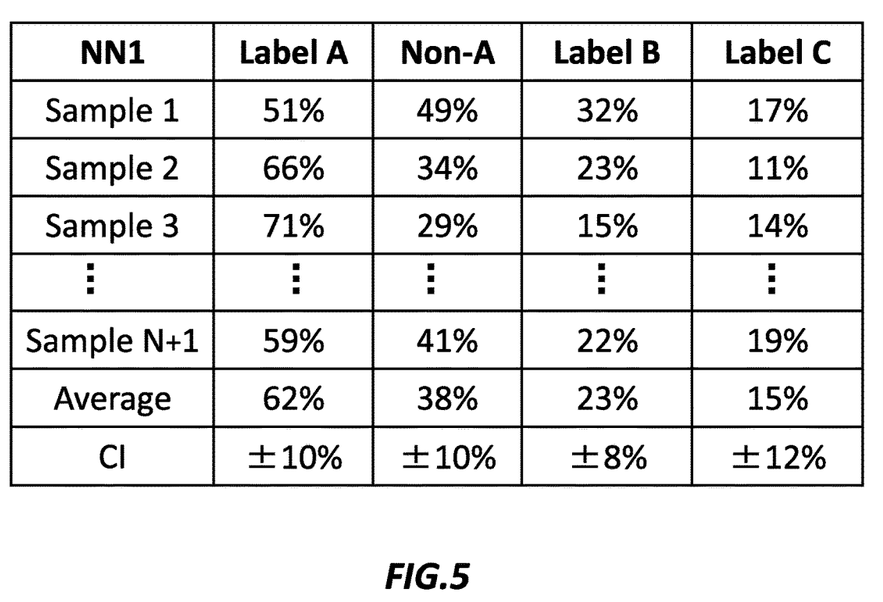
FIG. 5 shows the average of the estimated probabilities and the confidence interval according to an embodiment of the present invention.

FIG. 5 shows the average of the estimated probabilities and the confidence interval according to an embodiment of the present invention. In an embodiment of FIG. 5, the obtaining section can obtain one additional sample "Sample 2" at the first S160 and estimate a probability for "Sample 2" at the first S160 in iterations of a loop of S140-S190.

In an embodiment, the estimating section can estimate a probability that a label A applies to the additional sample "Sample 2" to be 66%, a probability that a label B applies to "Sample 2" to be 23%, and a probability that a label C applies to "Sample 2" to be 11%.

Similarly, the obtaining section can obtain one additional sample "Sample 3" at the second S160 and estimate a probability for "Sample 3" at the second S160. In an embodiment, the estimating section can estimate a probability that a label A applies to the additional sample "Sample 3" to be 71%, a probability that a label B applies to "Sample 3" to be 15%, and a probability that a label C applies to "Sample 3" to be 14%.

At S165, the determining section can determine a candidate label among the plurality of labels, based on the estimated probabilities of the plurality of samples, which are estimated at S120 and at one or more iterations of S160 for each of the plurality of labels, thereby updating the candidate label determined at the operation of S130 or the operation of a previous iteration of S165 with the label determined at the operation of the current S165. In an embodiment, the determining section can first calculate an average of the estimated probabilities of the plurality of samples for each of the plurality of labels, and then determine a label that has the largest average among the plurality of labels, as the candidate label.

In an embodiment of FIG. 5, an average of the estimated probabilities of the plurality of samples (i.e., Sample 1, Sample 2, Sample 3, . . . , Sample N+1, where N is the number of operations of S165) for Label A is 62%, an average of the estimated probabilities of the plurality of samples for Label B is 38%, and an average of the estimated probabilities of the plurality of samples for Label C is 15%. In an embodiment, the determining section can determine Label A, which has the largest average, as the candidate label.

At S170, the identifying section can calculate a dispersion of the estimated probabilities of the plurality of samples for the candidate label. In an embodiment, the identifying section can further calculate a confidence interval for the candidate label (CI). In an embodiment, the identifying section can calculate an interval such as the confidence interval (CI) with the following formula (1):

$$CI = \bar{x}_L \pm z \frac{1}{\sqrt{n}} \sqrt{\frac{\sum_{i=1}^{n} (x_{L,i} - \bar{x}_L)^2}{n-1}} \quad (1)$$

where n represents the number of the plurality of samples, z represents a value obtained from the Student's t-distribution for the number of samples n and a preset confidence level (e.g., 95% or 99%), i represents each sample in the plurality of samples (n samples), $x_{L,i}$ represents the estimated probability of i-th sample for the candidate label, and $\bar{x}_L$ represents the average of the estimated probabilities of the candidate label.

Since CI includes the number of samples n, a dispersion for the candidate label ($\sum_{i=1}^{n}(x_{L,i}-\bar{x}_L)^2/(n-1)$) and the average probability $\bar{x}_L$, the identifying section calculates CI based on these values. In alternative embodiments, the identifying section can calculate the interval differently from the CI as shown in formula (1) based on these values.

In alternative embodiments, the identifying section can adopt the Gaussian distribution instead of the Student's t-distribution depending on a value of n (i.e., the number of the plurality of samples). For example, the identifying section can adopt the Gaussian distribution when n exceeds 30. In other alternative embodiments, the identifying section can adopt n instead of (n−1) in formula (1).

In an embodiment of FIG. 5, the calculating section can calculate the confidence interval of the candidate label (Label A) as 62±10%, based on the estimated probabilities of Label A for Sample 1, Sample 2, Sample 3, . . . , and Sample N+1. The calculating section may or may not calculate the confidence intervals for other labels (i.e., Label B and Label C).

At S180, the identifying section can judge whether to identify the target label. In an embodiment, the identifying section can make the judgment based on (a) the estimated probabilities of the plurality of samples for the candidate label, (b) the dispersion for the candidate label, and (c) the number of the plurality of samples.

In another embodiment, the identifying section can judge whether to identify the target label based on (a') the average for the candidate label (which can be derived from (a) the estimated probabilities), (b) the dispersion for the candidate label, and (c) the number of the plurality of samples. In another embodiment, the identifying section can judge whether to identify the target label based on a confidence interval of the candidate label, which can be derived from (a') the average for the candidate label, (b) the dispersion, and (c) the number of the plurality of samples.

For example, the identifying section can judge whether the interval such as the confidence interval of the candidate label is above a confidence interval of all other labels without an overlap. The identifying section can calculate the confidence interval of all other labels by subtracting the confidence interval of the candidate label from 1 (100%). In an embodiment, the identifying section can perform this judgment by judging whether the following conditional equation (2) is true:

$$2\bar{x}_L - 2z\frac{1}{\sqrt{n}}\sqrt{\frac{\sum_{i=1}^{n}(x_{L,i}-\bar{x}_L)^2}{n-1}} - 1 > 0 \quad (2)$$

In an embodiment of FIG. 5, the identifying section can calculate the confidence interval of all other labels (shown as Non-A) as 38±10%, and then judge whether the confidence interval of Label A is above the confidence interval of Non-A.

Figure 6:
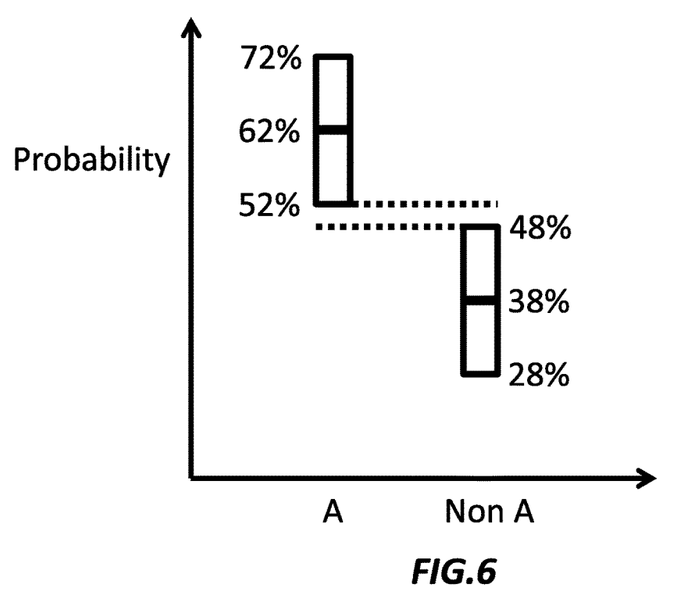
FIG. 6 shows the confidence intervals for label A and for not-label A according to an embodiment of the present invention.

FIG. 6 shows the confidence intervals for label A and for non-A according to an embodiment of the present invention. In an embodiment of FIG. 6, the confident intervals are the same as those shown in FIG. 5. As shown in FIG. 6, the confidence interval of Label A (52-72%) is above the confidence interval of non-A (38-48%) and does not overlap with the confidence interval of non-A. Therefore, in illustrative embodiments of FIGS. 5-6, the judgement by the identifying section is positive.

In an alternative embodiment, the identifying section can judge whether to identify the target label based on (a) the estimated probabilities of the plurality of samples for the candidate label, (b) the dispersion for the candidate label, and (c) the number of the plurality of samples, in a different manner from the embodiments explained above. For example, the identifying section can adopt a value above or below 0 in the right term in the conditional equation (2) instead of 0.

In another embodiment, the calculating section can perform the operation of S170 for not only for the candidate label but also for the other labels, and the identifying section can judge whether the confidence interval of the candidate label is above a sum of confidence intervals of all other labels, without an overlap. In an embodiment of FIG. 5, the identifying section can judge whether the confidence interval of Label A (62±10%) is above the sum of the confidence intervals of Label B and Label C (38±20%) without overlap.

The identifying section can proceed with S200 if the judgement is positive. The identifying section can proceed with S190 if the judgement is negative.

At S190, the identifying section can determine whether there remain samples that have not been obtained at S110 and S150 among all the samples. If the decision is positive, then the identifying section can go back to the operation of S150, and if the decision is negative, then the identifying section can proceed with S200.

At S200, the identifying section can identify the candidate label as the target label. Thereby, the identifying section can identify the target label, in response to judging that the estimated probability of the initial sample for the candidate label is above the threshold at S140, or in response to judging to identify the target label at S180, or in response to judging that there does not remain a sample yet obtained. For example, the identifying section can identify the target label in response to judging that the confidence interval of the candidate label is above the confidence interval of all other labels without overlaps at S180. In illustrative embodiments of FIGS. 5-6, the identifying section can determine Label A as the candidate label.

As explained above, the apparatus can first obtain an initial sample from among all of the samples, and then judge whether to identify a target label based on the probability estimated for the initial sample. In response to the identifying section judging not to identify the target label, the apparatus can perform iterations of a loop comprising operations S140-S190.

During the iterations of the loop, the apparatus can obtain the additional samples from remaining samples among all the samples, and then judge whether to identify a target label based on the probability estimated for all the obtained samples so far. In response to judging not to identify the target label during the operations in the loop, the apparatus can further obtain the additional sample(s) of the object to update the plurality of samples by adding the additional sample(s).

Then, the apparatus can estimate the probability for the additional sample(s) at the operation of next S160, determine a candidate label among the plurality of labels based on the estimated probabilities of the updated plurality of samples for each of the plurality of labels at S165, calculate a dispersion of the estimated probabilities of the plurality of updated samples for the candidate label at S170, and identify a target label among the plurality of labels based on the estimated probabilities of the plurality of updated samples for the candidate label, the dispersion for the candidate label, and the number of the plurality of updated samples at S180 and S190, if possible.

According to the operations shown in FIG. 2, since the apparatus can cease the estimation of probabilities for samples once it judges to identify the target label at S180, the apparatus may not estimate probabilities for all the samples. Therefore, the apparatus can reduce computational resources necessary for identifying the target label while maintaining accuracy in labeling the object.

Specifically, in some embodiments, the apparatus can determine the candidate label as the target label based on the confidence interval of the candidate label and the other labels. In some embodiments, the apparatus can identify the candidate label as the target label with at least a confidence level by which the confidence interval is calculated.

Although the obtaining section can obtain one sample as the initial sample S110 in the above embodiments, the obtaining section can obtain two or more samples as the initial samples at S110. In such embodiments, the estimating section can estimate a probability that a label applies to a sample for each of a plurality of labels, for each of the initial samples at S120, the determining section can determine the candidate label based on an average of the estimated probabilities of the initial samples at S130, and the identifying section can judge whether to identify the target label based on a comparison of the average and a threshold.

As shown in the flowchart in FIG. 2, the apparatus can iterate the loop of operations S140-S190. In an embodiment, the obtaining section can alter the number of additional samples for each of the iterations. For example, the obtaining section can increase the number of additional samples obtained at each operation of S150 as the number of the iterations increases.

In some embodiments, the apparatus can reduce the number of labels, for which operations in the loop are performed during the iterations of the loop. In these embodiments, the identifying section can generate a reduced label set by removing at least one of the plurality of labels from the plurality of labels and estimate the probabilities of the plurality of samples for the reduced label set, the determining section can determine the candidate label among the reduced label set, and thereby the identifying section can identify a target label among the reduced label set.

For example, the identifying section can generate the reduced label set, in response to determining that the left term in the conditional equation (2) is not above 0 but above a threshold TH (TH<0). The identifying section can generate the reduced label set by removing one or more labels having the smallest averages calculated at S165 among a current label set (i.e., an initial label set or the latest reduced label set).

In some embodiments, the apparatus may not perform operations of S110-S130 in FIG. 2, thereby performing only the dispersion-based judgement to identify the target label. In some embodiments, the obtaining section can obtain at least two samples at at least the first S150.

In some embodiments, the apparatus can perform an ensemble not only for the object by a plurality of samples but also for a model that estimates probabilities. In some embodiments, the estimating section can estimate the probabilities for a sample by a plurality of neural networks at S120 and/or S160. The apparatus can adopt other ensembling techniques.

The estimating section can use an average of the probabilities for the sample by the plurality of neural networks as the estimated probability for the sample. Alternatively, the estimating section can perform S130, S165, and/or S170 by utilizing all estimated probabilities for the sample by the plurality of neural networks. The plurality of neural networks can include different numbers of layers, nodes, and/or hyper parameters. The plurality of neural networks can be independently trained by a training section such as the training section 114.

Figure 7:
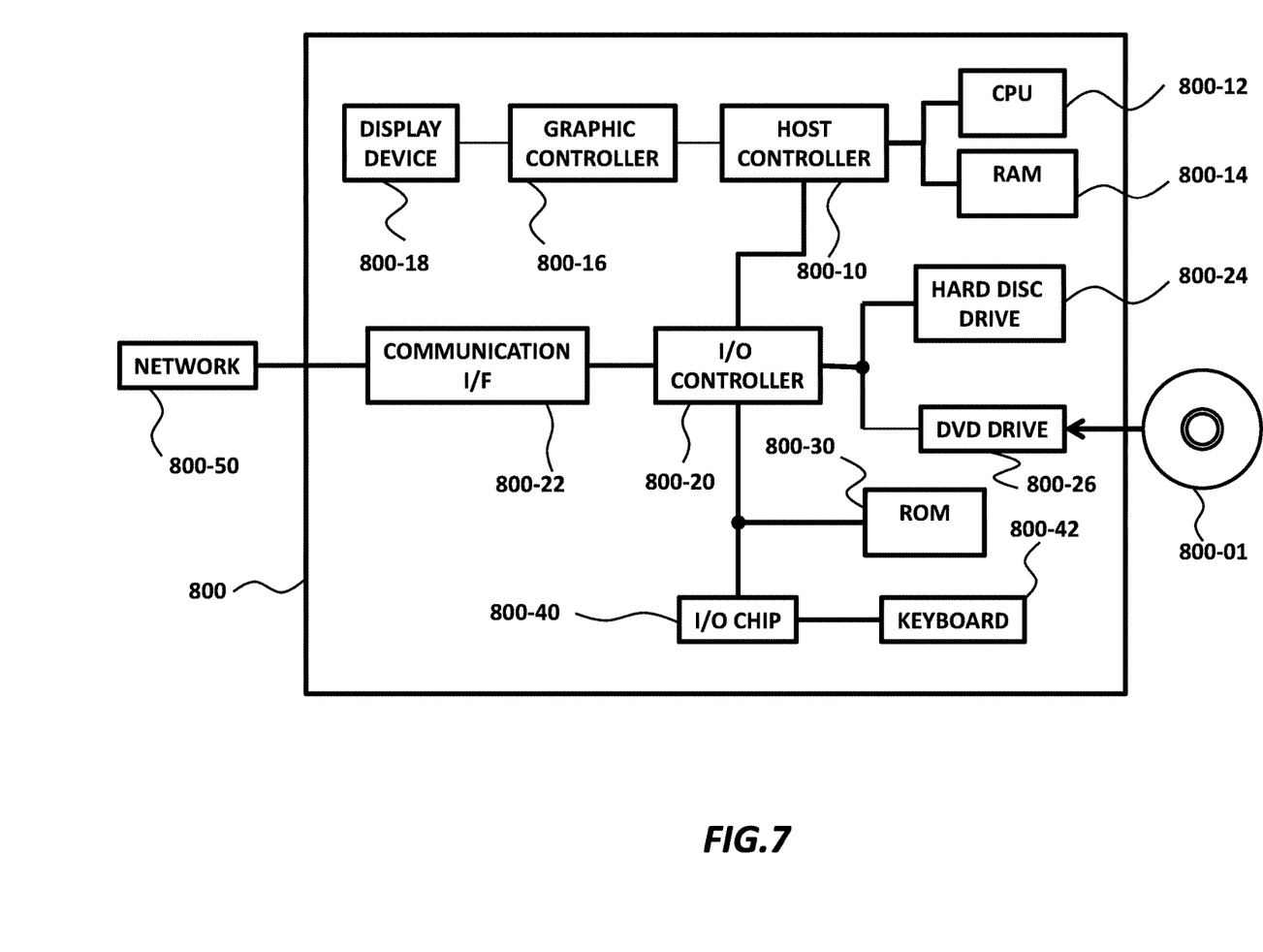
FIG. 7 shows an exemplary hardware configuration of a computer 800 that functions as a system, according to an embodiment of the present invention.

FIG. 7 shows an illustrative hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to an embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted by realizing the operation or processing of information in accordance with the usage of the computer 800.

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/replace of information, etc., as described throughout this description and designated by an instruction sequence of programs, and writes the result back to the RAM 800-14.

In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. An apparatus comprising:
a processor; and
one or more non-transitory computer readable mediums collectively including instructions that, when executed by the processor, cause the processor to perform operations including:
   obtaining, by a processor, a plurality of unlabeled samples of an object;
   estimating, by the processor, for each of the plurality of unlabeled samples, a probability that a label applies to the unlabeled sample, for each of a plurality of labels;
   calculating, by a processor, an average of the estimated probabilities of the plurality of unlabeled samples for each of the plurality of labels;
   determining, by the processor, a label that has a largest average among the plurality of labels, as a candidate label among the plurality of labels;
   calculating, by the processor, a dispersion of the estimated probabilities of the plurality of unlabeled samples for the candidate label; and
   identifying, by the processor, a target label among the plurality of labels based on the average of the estimated probabilities of the plurality of unlabeled samples for the candidate label, the dispersion for the candidate label, and a number of the plurality of unlabeled samples.

2. The apparatus according to claim 1, wherein the identifying a target label among the plurality of labels includes:
   judging whether to identify the target label, based on the estimated probabilities of the plurality of unlabeled samples for the candidate label, the dispersion for the candidate label, and the number of the plurality of unlabeled samples, and
   identifying the candidate label as the target label, in response to judging to identify the target label.

3. The apparatus according to claim 2, wherein the operations further include:
   obtaining one or more additional unlabeled samples of the object in response to judging not to determine the target label;
   estimating a probability that a label applies to each of the one or more additional unlabeled samples for each of a plurality of labels;
   determining a candidate label among the plurality of labels, based on the estimated probabilities of the plurality of unlabeled samples and the one or more additional unlabeled samples for each of the plurality of labels; and
   calculating a dispersion of the estimated probabilities of the plurality of unlabeled samples and the one or more additional unlabeled samples for the candidate label,
   wherein the identifying a target label among the plurality of labels is based on the estimated probabilities of the plurality of unlabeled samples and the one or more additional unlabeled samples for the candidate label, the dispersion of the plurality of unlabeled samples and the one or more additional unlabeled samples for the candidate label, and the number of the plurality of unlabeled samples and the one or more additional unlabeled samples.

4. A non-transitory computer-readable storage medium having instructions embodied therewith, the instructions executable by a processor or programmable circuitry to cause the processor or programmable circuitry to perform operations comprising:
   obtaining, by a processor, a plurality of unlabeled samples of an object;
   estimating, by the processor, for each of the plurality of unlabeled samples, a probability that a label applies to the sample, for each of a plurality of labels;
   determining, by the processor, a candidate label among the plurality of labels, based on the estimated probabilities of the plurality of unlabeled samples for each of the plurality of labels;
   calculating, by the processor, a dispersion of the estimated probabilities of the plurality of unlabeled samples for the candidate label;
   identifying, by the processor, a target label among the plurality of labels, according to the estimated probabilities of the plurality of unlabeled samples for the candidate label, the dispersion for the candidate label, and a number of the plurality of unlabeled samples, the identifying including:
      judging whether to identify the target label, based on the estimated probabilities of the plurality of unlabeled samples for the candidate label, the dispersion for the candidate label, and the number of the plurality of unlabeled samples, and
      identifying the candidate label as the target label, in response to judging to identify the target label;
   obtaining one or more additional unlabeled samples of the object in response to judging not to determine the target label;
   estimating a probability that a label applies to each of the one or more additional unlabeled samples for each of a plurality of labels;
   determining a candidate label among the plurality of labels, based on the estimated probabilities of the plurality of unlabeled samples and the one or more additional unlabeled samples for each of the plurality of labels; and
   calculating a dispersion of the estimated probabilities of the plurality of unlabeled samples and the one or more additional unlabeled samples for the candidate label,
   wherein the identifying a target label among the plurality of labels is based on the estimated probabilities of the plurality of unlabeled samples and the one or more additional unlabeled samples for the candidate label, the dispersion of the plurality of unlabeled samples and the one or more additional unlabeled samples for the candidate label, and the number of the plurality of unlabeled samples and the one or more additional unlabeled samples.

5. The non-transitory computer-readable storage medium according to claim 4, wherein the determining a candidate label among the plurality of labels includes:
   calculating an average of the estimated probabilities of the plurality of unlabeled samples for each of the plurality of labels; and
   determining a label that has the largest average among the plurality of labels, as the candidate label.

* * * * *